US006819718B1

United States Patent
Koehn et al.

(10) Patent No.: US 6,819,718 B1
(45) Date of Patent: Nov. 16, 2004

(54) APPARATUS AND METHOD FOR TRANSMITTING PUNCTURED OR REPEATED DATA

(75) Inventors: Reinhard Koehn, Berlin (DE); Bernhard Raaf, Munich (DE); Volker Sommer, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/807,040

(22) PCT Filed: Oct. 1, 1999

(86) PCT No.: PCT/EP99/07312

§ 371 (c)(1),
(2), (4) Date: Jun. 29, 2001

(87) PCT Pub. No.: WO00/21234

PCT Pub. Date: Apr. 13, 2000

(30) Foreign Application Priority Data

Oct. 7, 1998 (EP) .............................. 98118934

(51) Int. Cl.$^7$ .............................. H04B 14/04
(52) U.S. Cl. .............................. 375/242
(58) Field of Search .............................. 375/242, 225; 341/95; 370/476, 505; 704/219, 211

(56) References Cited

U.S. PATENT DOCUMENTS

| | | | |
|---|---|---|---|
| 4,908,827 A | | 3/1990 | Gates |
| 5,909,434 A | * | 6/1999 | Odenwalder et al. ....... 370/342 |
| 6,111,912 A | * | 8/2000 | Cohen et al. ............... 375/225 |
| 6,223,153 B1 | * | 4/2001 | Bowater et al. ............ 704/219 |
| 6,396,423 B1 | * | 5/2002 | Laumen et al. ............. 341/95 |

FOREIGN PATENT DOCUMENTS

| | | |
|---|---|---|
| WO | WO 96/24993 | 8/1996 |
| WO | WO 97/16899 | 5/1997 |
| WO | WO 00/21234 | 4/2000 |

OTHER PUBLICATIONS

Copy of International Search Report dated Feb. 4, 2000.
Copy of Interntional Preliminary Examination Report dated Jan. 17, 2001.
SMG2 UMTS Physical Layer Expert Group, UTRA Physical Layer Description, v0.4.
3$^{rd}$ Generation Partnership Project; Technical Specification Group Radio Access Network; Multiplexing and channel coding (FDD) Release 1999.
Sunir Shah, WASTE—Warfare by Artificial Strategic and Tactical Engines, Jan. 15, 1997, intranet.on.ca.
Jurgen Plate, Computergrafik: Einfuhrung—Algorithmen—Programmentwicklung, Berlin.

* cited by examiner

*Primary Examiner*—Don N. Vo
(74) *Attorney, Agent, or Firm*—Fish & Richardson P.C.

(57) ABSTRACT

A data communications apparatus, which communicates data frames, includes a converter, which converts a data frame into a data block for transmission. The data block has a size which is different than a size of the data frame. The converter includes a puncturer for puncturing or repeating bits or symbols at positions within the data frame that are determined in accordance with a selection strategy. The selection strategy uses a digital differential analyzer-type algorithm.

14 Claims, 3 Drawing Sheets

APPARATUS AND METHOD FOR TRANSMITTING PUNCTURED OR REPEATED DATA

BACKGROUND

The present invention relates to data communication. apparatus and methods for communicating data. More specifically, the present invention relates to data communications apparatus and methods of communicating data in which data is punctured or repeated.

Digital communications systems are arranged to communicate data by representing the data in a form which facilitates transmission of the data via a medium through which communication is affected. For example, in a case of radio communications, the data is represented as radio signals and transmitted between transmitters and receivers of the communications system via the ether. In the case of broadband telecommunications networks, the data may be represented as light and communicated via, for example, a fibre optic network between transmitters and receivers of the system.

During transmission of data, bits or symbols of the communicated data can be corrupted to the effect that these bits or symbols can not be correctly determined at the receiver. For this reason, the data communications systems often include means for mitigating the corruption of the data which occurs during transmission. One of these means is to provide transmitters of the system with encoders, which encode the data prior to transmission, in accordance with an error control code. The error control code is arranged to add redundancy to the data in a controlled way. At the receiver, errors occurring during transmission may be corrected by decoding the error control code, thereby recovering the original data. The decoding is effected using an error decoding algorithm corresponding to the error control code, which is known to the receiver.

After data has been encoded, there is often a requirement to puncture data bits or symbols from a block of encoded data before transmission of that data. The term puncturing as used herein refers to a process of cancelling or deleting bits from an encoded data block to the effect that the punctured bits are not transmitted with that data block puncturing might be required because, for example, a multiple access scheme, which serves to effect communication of the data via the data bearing media, requires the data to be formatted into blocks having a pre-determined size, which does not correspond to the size of the encoded data frame. In order to fit the encoded data frame into the transport data block of the pre-determined size, therefore, data bits from the encoded data frame are either punctured, to decrease the size of the encoded data block, in a case where the encoded data frame is larger than the size of the transport block, or repeat bits of the encoded data frame in a case where the encoded data frame is smaller than the pre-determined size of the transport block.

As will be appreciated, the data frames may be transmitted un-encoded in the transport data block. In this case, it is not appropriate to puncture the data frame in order to fit the data frame into the transport data block, a plurality of transport data blocks must be used to convey the data frame. In a case where the data frame is smaller than the transport data block, then the data bits or symbols are repeated to an extent necessary to fill the remainder of the transport data block.

As is familiar to those skilled in the art, an effec t of puncturing an encoded data frame, is that a probability of correctly recovering the original data is reduced. Furthermore, the performance of known error control codes and decoders for these err or c control codes is best when the errors occurring during transmission of the data are caused by Gaussian noise, with an effect that the errors are independently distributed throughout the transport data block. Similarly, therefore, if an encoded data frame is to be punctured, the positions within the encoded data frame at which bits are punctured, should be separated from each other as far as possible. As such, the puncturing positions should be evenly distributed throughout the frame. Similarly, because errors during transmission often occur in bursts, particularly in the case of radio communications systems which do not employ interleaving, positions within an encoded or an un-encoded data frame, at which data bits are to be repeated, should be arranged to be evenly separated throughout the frame.

Known methods of selecting the positions of bits or symbols to be punctured or repeated within an encoded data frame, include dividing the number of bits or symbols within a frame, by the number of bits or symbols to be punctured and selecting positions at integer values corresponding to the division. However, in a case where the number of bits to be punctured is not an integer division of the frame, an equi-distant separation of punctured or repeated positions does not result, providing the disadvantage that some positions may be closer than this integer, and in some cases even adjacent one another.

U.S. Pat. No. 4,908,827 is directed to a method and apparatus for puncturing excessive bits of convolutional data. By way of example, every third bit is removed. First and second puncturing is performed to get the data stream properly formatted.

PCT published application WO 97/16899 sets out a method and apparatus for combining frames to facilitate data transmission. The combination includes puncturing of excessive data bits. The selection method is left to one skilled in the art.

PCT published application WO 96/24993 is concerned with the smooth insertion of null data within a data stream. The application is not concerned with removal or puncturing of any data bits. Rather, the application "smoothly" fills in the empty spaces about occupied bytes such that the data carrying bytes can be effectively communicated in fixed frames. The application makes use of Bresenham's algorithm in the selection of an smooth placement of null bytes. The placement is intended to effect buffer and latency savings.

It is an object of the present invention to provide a means for puncturing or repeating data bits from a data frame in a single iteration, in which the positions of the punctured or repeated bits are substantially equi-distant throughout the frame.

SUMMARY

The present invention resides generally in a data communication apparatus in which frames of data are converted into blocks for transmission by puncturing or repeating bits or symbols from the frame at positions determined in accordance with a selection algorithm, the positions being equally distributed throughout the data frame.

According to the present invention there is provided a data communications apparatus which operates to communicate data frames, the apparatus comprising means for converting the data frames into data blocks for transmission, which data blocks are of a size which is different to that of the data frames, the means for converting the data frames including means for puncturing or repeating bits or symbols at positions within the data frame determined in accordance with a selection strategy, wherein the selection strategy is arranged to provide a substantially equal distribution of the positions throughout the data frame.

A converter means serves to convert the data frames into data transport blocks having a different size to that of the data frames, and includes means for puncturing or repeating the data frame at positions within the data frame determined in accordance with a selection strategy. By arranging for the selection strategy to made to the effect that the positions to be repeated or punctured are equally distributed throughout the data frame, as opposed to attempting to make the positions equi-distant from each other, the selected positions will be such as to provide an optimum mean separation of the positions within the data frame.

The selection strategy may be affected by a selection algorithm which operates in accordance with the size of said data frame, in combination with the number bits or symbols to be punctured or repeated. The selection algorithm may be a digital differential analyzer-type algorithm, or the like.

The Digital Differential Analyser algorithm is known per se in the field of computer graphics for graphically representing lines in two dimensions for use in computer generated images. The Digital Differential Analyser is disclosed in a publication entitled "Computergrafik: Einf ührung-Algorithmen-Programmentwicklung", by Jürgen Plate, pages 55 to page 65, ISBN Number 3-7723-5006-2 and is further described in an article in association with drawing lines, entilted ‚Bresenham's Line Algorithm by Sunir Shah, 15 Jan. 1997, in a publication "WASTE—Warfare by Artificial Strategic and Tactical Engines", published on the Internet at address "http://intranet.on.ca/-sshah/waste/art7.html".

The use of an adapted version of a digital differential analyser-type algorithm, provides particular advantages. For example, the puncturing of adjacent bits is avoided, punctured bits are equally distributed over the transmitted data frame, only one pass is required for puncturing with any desired rate, and the same selection algorithm of substantially low complexity, can be used for puncturing and repetition. Furthermore the algorithm facilitates adaptation to additional constraints for the position of selected bits, such as that required by a Potential Puncturing Grid (PPG), as described in "Special Mobile Group 2" UMTS-11 Tdoc 229/98, entitled "Service Multiplexing".

The data communications apparatus may further include an encoder which operates to encode the data frame in accordance with an encoding algorithm. The encoding algorithm may be an error control encoding algorithm. For example the encoding algorithm, may operate in accordance with a block code such as a B-C-H, Reed-Solomon or Hamming code. Furthermore the encoding algorithm could be a convolutional code, a turbo code or a product code.

According to a further aspect of the present invention there is provided a method of communicating data frames, comprising the step of converting said data frames into data blocks for transmission, which data blocks are of a different size to that of the data frames, the step of converting the data frames including puncturing or repeating bits or symbols at positions within the data frame determined in accordance with a selection strategy, wherein the selection strategy is arranged to provide an equal distribution of the positions throughout the data frame.

One embodiment of the present invention will now be described, by way of example only, with reference to the accompanying drawings wherein;

DETAILED DESCRIPTION

An example embodiment of the present invention will be described with reference to a mobile radio communications system. Mobile radio communications systems are provided with multiple access systems which operate, for example, in accordance with Time Division Multiple Access (TDMA) such as that used in the Global System for Mobiles (GSM), which is a mobile radio telephone standard administered by the European Telecommunications Standards Institute. The mobile radio communications system, alternatively, could be provided with a multiple access system which operates in accordance with Code Division Multiple Access (CDMA) such as that proposed for the third generation Universal Mobile Telecommunication System. However, as will be appreciated, any data communications system could be used to illustrate an example embodiment of the present invention, such as a Local Area Network, or a Broadband Telecommunications Network operating in accordance with Asynchronous Transfer Mode. These illustrative example data communications systems are characterised in particular in that data is transmitted as bursts, packets or blocks. In the case of a mobile radio communications system, the data is transported in bursts of data bearing radio signals, which represent a pre-determined data size. An example of such a mobile radio communication system is shown in FIG. 1.

Figure 1:
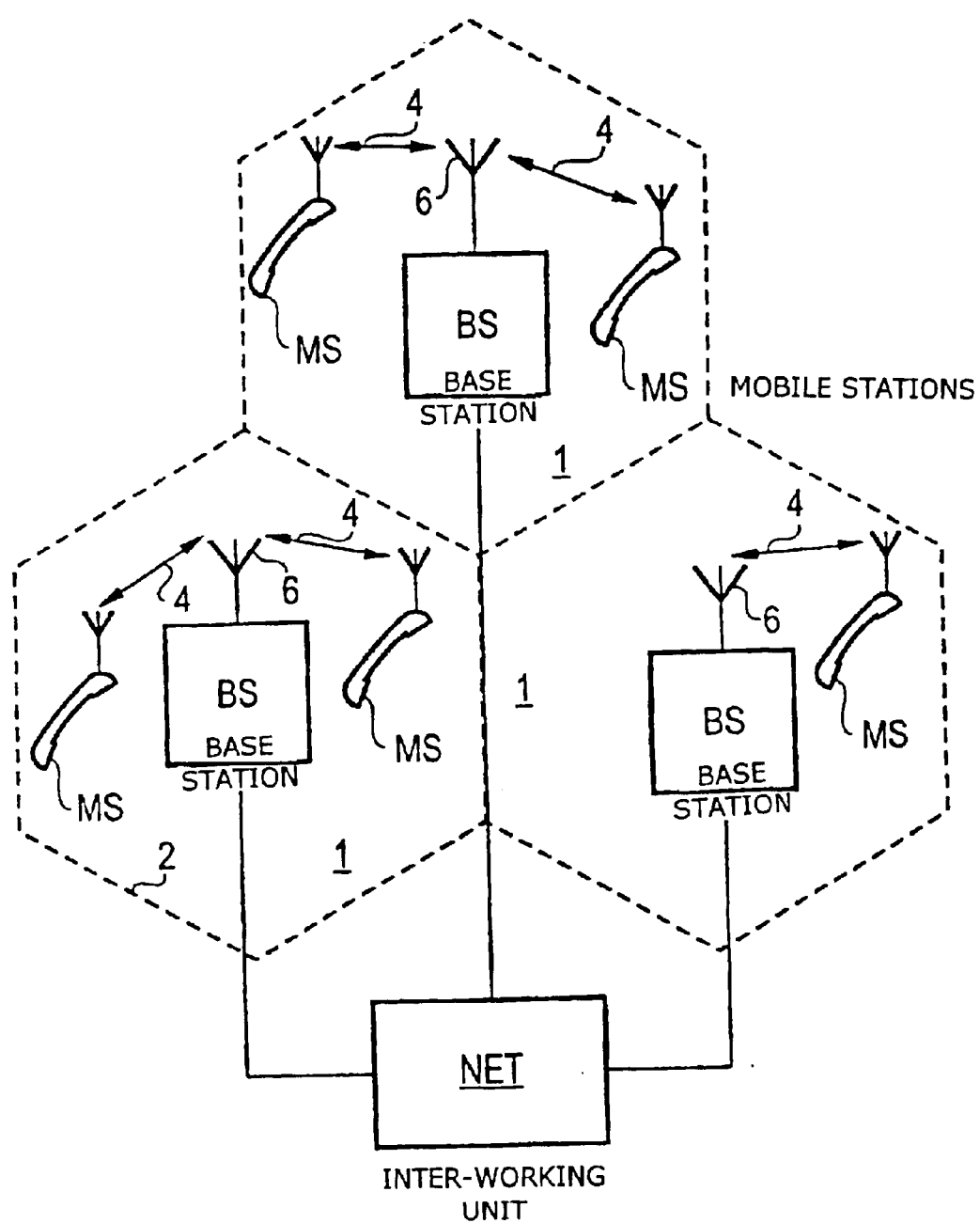
FIG. 1 is a schematic block diagram of a mobile radio communication system.

In FIG. 1, three base stations BS, are shown to communicate radio signals with mobile stations MS, within a radio coverage area formed by cells 1 defined by broken lines 2. The base stations BS, are coupled together using a network inter-working unit NET. The mobile stations MS, and the base stations BS communicate data by transmitting radio signals designated 4, between antennas 6, coupled to the mobile stations MS and the base stations BS. The data is communicated between the mobile stations MS and the base stations BS using a data communications apparatus in which the data is transformed into the radio signals 4, which are communicated to the receive antenna 6, which detects the radio signals. The data is recovered by the receiver from the radio signals.

Figure 2:
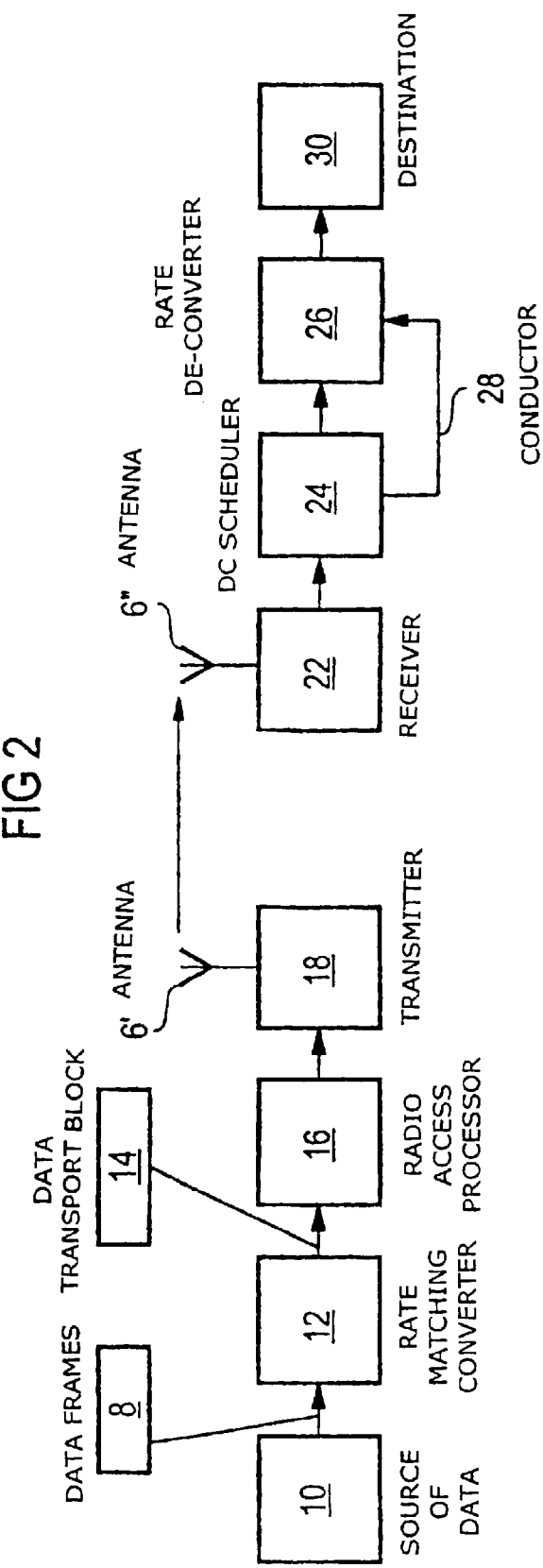
FIG. 2 is a schematic block diagram of a data communications apparatus forming a link between the mobile station and a base station of the communications network shown in FIG. 1.

An illustrative example of a data communications apparatus forming a radio communications link between one of the mobile stations MS, and one of the base stations BS, is shown in FIG. 2, where parts also appearing in FIG. 1 bear identical numerical designations. In FIG. 2 a source of data 10, generates data frames 8, at a rate determined by a type of data which the source is generating. The data frames 8, generated by the source 10, are fed to a rate converter 12, which operates to convert the data frames 8, into transport data blocks 14. The transport data blocks 14, are arranged to be substantially equal in size, to a pre-determined size of an amount of data which can be carried by bursts of data bearing radio signals via which data is communicated by a radio interface formed by a transmitter 18, and receiver 22, pair.

The data transport block 14 is fed to a radio access processor 16, which operates to schedule transmission of the transport data block 14, over the radio access interface. At an appropriate time the transport data block 14, is fed by the radio access processor 16, to a transmitter 18 which operates to convert the transport data block into the burst of data bearing radio signals which are transmitted in a time period allocated for the transmitter to effect communication of the radio signals. At the receiver 22, an antenna 6" of the receiver detects the radio signals and down converts and recovers the data frame which is fed to a radio access de-scheduler 24. The radio access de-scheduler 24, feeds the received data transport block to a rate de-converter 26, under control of the multiple access de-scheduler 24, effected via a conductor 28. The rate de-converter 26, thereafter feeds a representation of the regenerated data frame 8, to a destination or sink for the data frame 8 which is represented by the block 30.

Figure 3:
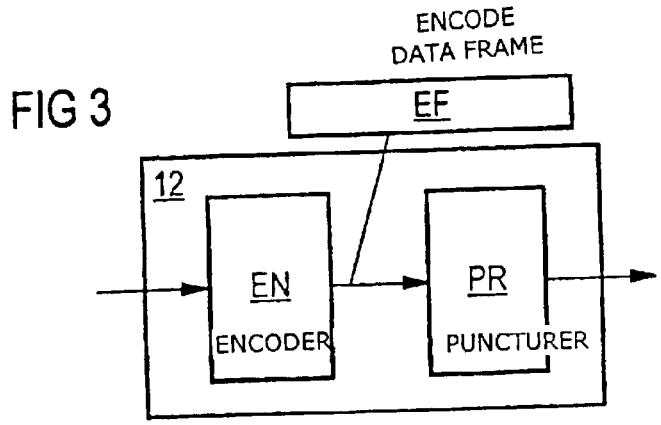
FIG. 3 is a schematic block diagram of a rate converter shown in FIG. 2.

The rate converter 12, and rate de-converter 26, are arranged to make, as far as possible, optimum use of the data bearing capacity available within the transport data block 14. This is effected in accordance with the illustrative embodiment of the present invention by the rate matching converter 12, which operates to encoded the data frame, and then puncture or repeat data bits or symbols selected from the encoded data frame, to the effect of generating a transport data block, which fits with the size of the data blocks 14. A block diagram of the rate converter 12, is shown in FIG. 3, where parts also appearing in FIG. 2, bear identical numerical designations. In FIG. 3, the rate converter 12, is shown to have an encoder EN, and a puncturer PR. The data frame 8, fed to the encoder EN, is encoded to generate an encoded data frame EF, which is fed to the puncturer PR. The encoded data frame is then punctured by the puncturer PR, to generate the data transport block 14.

The operation of the rate matching converter 12, will now be described. In order to explain the advantages of the illustrative embodiment of the present invention, it is first instructive to review a process by which bits or symbols are selected for puncturing or repetition, according to a prior art selection strategy. The result of puncturing a data frame according to the prior art selection strategy is illustrated in FIG. 4.

Figure 4:
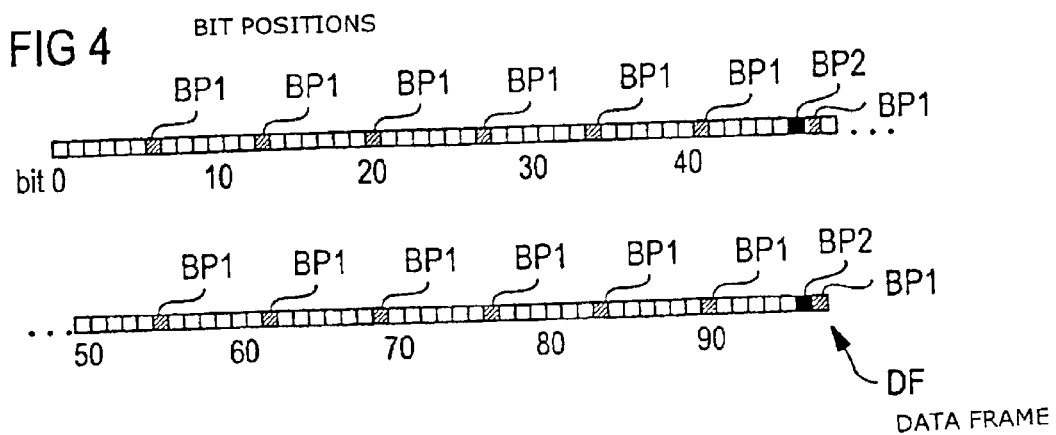
FIG. 4 is a diagram illustrating a result of puncturing bits in accordance with a prior art selection strategy.

In FIG. 4, an encoded data frame DF, is shown with bit positions BP1, selected for puncturing. The selection of the positions of the bits to be punctured, illustrated in FIG. 4, has been made in accordance with a known selection strategy described in section 6.2.3.3 of the "Universal Terrestrial Radio Access Frequency Division Duplex, multiplexing, channel coding and interleaving" description (xx.04) of the "Special Mobile Group 2" UMTS-L1 Tdoc 396/98, as current before the data of filing of the present patent application. This prior art selection algorithm attempts to select the positions for puncturing or repetition so that the positions are equi-distant from one another. Unfortunately, it is not possible to find an integer value for the puncturing rate in the general case. For this reason the prior art algorithm has to work in several iterations, with independent puncturing of equal-distances in each iteration. Because the iterations work independently, it is not possible to prohibit puncturing of adjacent bits. This is illustrated by FIG. 4 in which the selection algorithm attempts to select sixteen bits for puncturing from a total of ninety eight. To achieve this, two iterations are necessary. In the first iteration every 7th bit (ceil(98/16)=ceil(6.125)=7) is selected at the positions BP1, (light grey), and in the second iteration two bits out of the 84 remaining bits have to be punctured. So every (84/2)= 42nd bit is removed, which is shown as the second puncturing positions BP2 (dark shade). As a result, adjacent bit position numbers 47 and 48 are removed from the original data.

In other cases even three adjacent bits may be punctured. This happens for example when puncturing 462 bits out of 2380 source bits (puncturing rate of 0.19).

The prior art selection algorithm has several drawbacks. With the known selection algorithm, it is possible that two or more adjacent bits are selected for puncturing. Furthermore, for most puncturing ratios the punctured bits are not equally distributed, and an unknown number of puncturing iterations over the data frame is necessary, complicating a hardware implementation.

Figure 5:
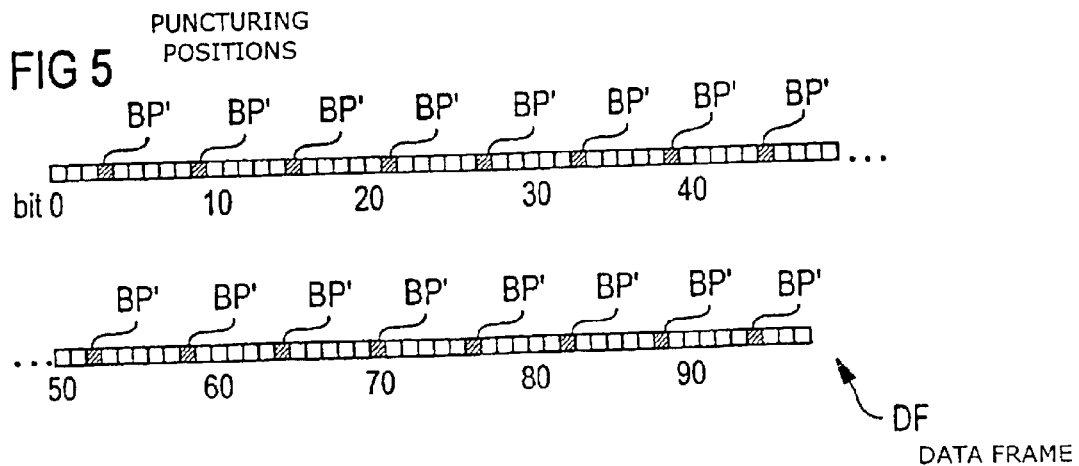
FIG. 5 is a diagram illustrating a result of puncturing bits using a selection strategy in accordance with the present invention.

A selection algorithm which operates in accordance with an illustrative embodiment of the present invention, operates in accordance with an adapted version of the Digital Differential Analyser algorithm as herein before described. A result of selecting bit positions for puncturing using this selection algorithm, is shown in FIG. 5, where once again, sixteen bit positions have been selected for puncturing out of ninety eight bits. As can be ascertained from FIG. 5, the separation between puncturing positions BP', is always 6 or 7 bits. As such the selected positions BP', for puncturing are equally distributed over the whole data frame, and this is effected in a one-pass selection process according to the algorithm.

A mathematical description of the selection algorithm, according to the illustrative embodiment is presented as follows:

Input data:
$X_i$ number of input bits
$N_{p/r}$ number of bits to be punctured/repeated
The puncturing/repetition rule is as follows:

| | |
|---|---|
| $e = 2*N_{p/r} - X_i$ | - - initial error between |
| current and desired puncturing ratio | |
| x = 0 | - - index of current bit |
| do while x < $X_i$ | |
| if e > 0 then | - - check if bit number x |
| should be punctured/repeated | |
| puncture or repeat bit x | |
| $e = e + (2*N_{p/r} - 2* X_i)$ | - - update error |
| else | |
| $e = e + 2*N_{p/r}$ | - - update error |
| end if | |
| x = x + 1 | - - next bit |
| end do | |

As will be appreciated by those skilled in the art, various modifications may be made to the embodiment herein before described without departing from the scope of the present invention. In particular, the data frame may or may not be encoded, and the bits or symbols selected in accordance with the selection algorithm may be punctured or repeated or a combination of puncturing and repeating.

What is claimed is:

1. A data communications apparatus which communicates data frames, the apparatus comprising:
   a converter which converts a data frame into a data block for transmission, the data block having a size which is different than a size of the data frame, the converter comprising:

a puncturer for puncturing or repeating a bit or a symbol at a position within the data frame that is determined in accordance with a selection strategy, the selection strategy using a digital differential analyzer-type algorithm.

2. The apparatus of claim 1, wherein the digital differential analyzer-type algorithm is used for puncturing bits or symbols.

3. The apparatus of claim 2, where the digital differential analyzer-type algorithm comprises a Bresenham algorithm.

4. The apparatus of claim 1, further comprising an encoder that encodes the data frame in accordance with an encoding algorithm.

5. The apparatus of claim 4, wherein the encoding algorithm comprises an error control encoding algorithm.

6. A method of communicating data frames, comprising:

converting a data frame into a data block for transmission, the data blocks having a size which is different than a size of the data frame;

wherein converting the data frame comprises:

puncturing or repeating a bit or a symbol at a position within the data frame that is determined in accordance with a selection strategy, the selection strategy using a digital differential analyzer-type algorithm.

7. The method of claim 6, wherein the digital differential analyzer-type algorithm is used for puncturing bits or symbols.

8. The method of claim 6, wherein the digital differential analyzer-type algorithm comprises a Bresenham algorithm.

9. The method of claim 8, further comprising encoding the data frame in accordance with an encoding algorithm.

10. The method of claim 9, herein the encoding algorithm is an error control encoding algorithm.

11. The apparatus of claim 2, further comprising an encoder that encodes the data frame in accordance with an encoding algorithm.

12. The apparatus of claim 3, further comprising an encoder which encodes the data frame in accordance with an encoding algorithm.

13. The apparatus of claim 1, wherein the bit or symbol is a first bit or first symbol and wherein the puncturer is for puncturing or repeating a second bit or second symbol separated from the first bit or first symbol by at least a third bit or third symbol that has not been repeated or punctured.

14. The method of claim 6, wherein the bit or symbol is a first bit or first symbol and further comprising puncturing or repeating a second bit or second symbol separated from the first bit or symbol by at least a third bit or symbol that has not been repeated or punctured.

* * * * *